United States Patent
Sydoruk et al.

(10) Patent No.: US 12,259,360 B2
(45) Date of Patent: Mar. 25, 2025

(54) DEVICE AND METHOD FOR DETERMINING THE VOLUME AND POROSITY OF OBJECTS AND BULK MATERIALS

(71) Applicant: Forschungszentrum Juelich GmbH, Juelich (DE)

(72) Inventors: Viktor Sydoruk, Juelich (DE); Johannes Kochs, Aachen (DE); Dagmar van Dusschoten, EP Munstergeleen (NL); Siegfried Jahnke, Velbert (DE)

(73) Assignee: FORSCHUNGSZENTRUM JUELICH GMBH, Juelich (DE)

( * ) Notice: Subject to any disclaimer, the term of this patent is extended or adjusted under 35 U.S.C. 154(b) by 379 days.

(21) Appl. No.: 17/296,557

(22) PCT Filed: Nov. 14, 2019

(86) PCT No.: PCT/DE2019/000298
§ 371 (c)(1),
(2) Date: May 25, 2021

(87) PCT Pub. No.: WO2020/125828
PCT Pub. Date: Jun. 25, 2020

(65) Prior Publication Data
US 2022/0011272 A1    Jan. 13, 2022

(30) Foreign Application Priority Data
Dec. 18, 2018   (DE) .................... 10 2018 009 800.2

(51) Int. Cl.
*G01N 29/24* (2006.01)
*G01F 17/00* (2006.01)
*G01N 29/22* (2006.01)

(52) U.S. Cl.
CPC ......... *G01N 29/2418* (2013.01); *G01F 17/00* (2013.01); *G01N 29/222* (2013.01)

(58) Field of Classification Search
CPC ... G01F 17/00; G01N 29/2418; G01N 29/222
See application file for complete search history.

(56) References Cited

U.S. PATENT DOCUMENTS 4,072,046 A     2/1978 Lao
4,474,061 A *  10/1984 Parker .................... G01F 9/001
                                                       73/290 V (Continued)

FOREIGN PATENT DOCUMENTS

| DE | 236591 A1 | 6/1986 |
| JP | 2000258325 A * | 9/2000 |
| JP | 2005278019 A * | 10/2005 | ............... G01H 9/00 |

OTHER PUBLICATIONS

Ippei Torigoe, et al., "Acoustic Bridge Volumeter", 30th SICE Annual Conference, Dec. 2001, pp. 164-170, vol. E-1, No. 1, Society of Instrument and Control Engineers, Tokyo, Japan.

(Continued)

*Primary Examiner* — Judy Nguyen
*Assistant Examiner* — James Split
(74) *Attorney, Agent, or Firm* — LEYDIG, VOIT & MAYER, LTD.

(57) ABSTRACT

The invention relates to a method for determining the total volume and/or the true volume and the porosity of objects, wherein a gas chamber of a closed measurement chamber is compressed or expanded, this volume change $\Delta V$ in the measurement chamber causes a movement change of a membrane of a transducer, wherein the movement of this membrane of the transducer correlates linearly with the volume change $\Delta V$ in the measurement chamber, the mechanical movement of said membrane of the transducer being triggered by at least one frequency, as a function of the (Continued)

volume of an object in a measurement chamber, and the movement change of the membrane being measured by a sensor head. The invention also relates to a device suitable for the method.

23 Claims, 3 Drawing Sheets

(56) References Cited

U.S. PATENT DOCUMENTS

| | | | | |
|---|---|---|---|---|
| 4,561,298 A | * | 12/1985 | Pond | G01F 17/00 |
| | | | | 73/149 |
| 4,713,966 A | * | 12/1987 | Thyren | G01F 17/00 |
| | | | | 73/149 |
| 4,991,433 A | * | 2/1991 | Warnaka | G01F 22/02 |
| | | | | 367/908 |
| 5,824,892 B1 | | 10/1998 | Ishii | |
| 6,459,798 B1 | * | 10/2002 | Paritsky | H04R 23/008 |
| | | | | 381/172 |
| 7,707,877 B2 | * | 5/2010 | Nishizu | G01F 17/00 |
| | | | | 73/149 |
| 2016/0120443 A1 | | 5/2016 | Margalit | |

OTHER PUBLICATIONS

T Kobata, et al., "Measurement of the vol. of weights using an acoustic volumeter and the reliability of such measurement", Metrologia, Mar. 24, 2004, pp. 75-83, vol. 41, Institute of Physics Publishing, United Kingdom.

* cited by examiner

DEVICE AND METHOD FOR DETERMINING THE VOLUME AND POROSITY OF OBJECTS AND BULK MATERIALS

CROSS-REFERENCE TO PRIOR APPLICATIONS

This application is a U.S. National Phase Application under 35 U.S.C. § 371 of International Application No. PCT/DE2019/000298, filed on Nov. 14, 2019, and claims benefit to German Patent Application No. DE 10 2018 009 800.2, filed on Dec. 18, 2018. The International Application was published in German on Jun. 25, 2020 as WO 2020/125828 under PCT Article 21(2).

FIELD

The disclosure relates to a device and a method for determining the volume and the porosity of objects and bulk materials.

BACKGROUND

In many technical fields, there is a need to measure the volume and the porosity of objects and bulk materials.

Determining the volume of an object is often difficult, in particular when the object has an irregular shape and/or roughness or pores on its surface. Existing techniques for measuring volumes of such bodies are, for example, computed tomography (CT scans, i.e., imaging 3D measurement with x-rays, for example), gas volumeters or acoustic volumeters. Optical methods, which are based on the detection of object projections from different angles and subsequent 3D reconstruction of the object, are also available. A few disadvantages are therefore associated with the methods according to the prior art.

CT methods are complex and expensive, generate very large amounts of data and require high computing powers. As a rule, the duration of the measurements is also quite high. In addition, any influence by x-rays, e.g., in the case of biological objects, must be taken into account.

In the case of gas volumeters, the use of external gases is required. The time of the measurements is quite high in comparison to the accuracy. Measuring the porosity of irregularly shaped solid objects is not possible. In addition, the measured object must partially withstand elevated pressures; as a rule, the measurement sequence is also quite complex.

In the case of acoustic volumeters (U.S. Pat. Nos. 4,072, 046A, 5,824,892A, Torigoe, I. & Ishii, Y. Acoustic Bridge Volumeter. *Trans. Soc. Instrum.* Control Eng. E-1, 164-170, 2001; Kobata, T., Ueki, M., Ooiwa, A. & Ishii, Y. Measurement of the volume of weights using an acoustic volumeter and the reliability of such measurement. *Metrologia* 41, S75-S83, 2004), the measuring principle is inefficient as a result of the use of two fixed volumes connected, for example, via a tube. This leads to losses. Moreover, the acoustic volumeters described so far only operate in a small frequency range.

In the case of optical methods, the measuring time, the achievable accuracy, large amounts of data and high computing powers can be problematic. Precise volume determination of, for example, concavely shaped, porous or very complex objects is thus hardly possible or impossible.

In the case of liquid displacement (Archimedes), the measuring time, achievable accuracy, effects of the liquid on the object and adhering liquids are disadvantageous.

SUMMARY

In an embodiment, the present disclosure provides a method for determining the total volume and/or the true volume of objects, with which a transducer causes a gas space of a closed measuring chamber to be compressed or expanded by alternating compression and expansion of the gas in the gas space of the measuring chamber, a volume change $\Delta V$ in the measuring chamber causing a movement change of a membrane of a transducer. The movement of this membrane of the transducer correlates linearly with the volume change $\Delta V$ in the measuring chamber. The mechanical movement of the membrane of the transducer is triggered by at least one frequency as a function of the volume of an object in a measuring chamber and the movement change of the membrane is measured by a sensor head. The correlation for the volume change $\Delta V$ in the measuring chamber can be described by $\Delta V \approx S\Delta 1$. $\Delta V$ represents volume change, $\Delta L$ indicates deflection of the membrane of the transducer, and S is a surface area of the membrane of the transducer. The method includes first carrying out an empty measurement without an object in the measuring chamber. A signal $\varepsilon$ is generated in the measuring space without an object, and the following equation applies to this signal $\varepsilon$ without an object in the measuring chamber:

$$\varepsilon = \frac{V_0}{p_a \gamma_q S^2} C(A, f, t).$$

A represents amplitude, f represents frequency, t represents time, $V_0$ is an internal volume of the measuring chamber, $p_a$ indicates ambient pressure, and $\gamma_q$ is a quasi-adiabatic index of the air/gas in the gas space of the measuring chamber. C(A, f, t) is given by $$C_0 \left( \frac{\partial func(A, f, t)}{\partial t} - \frac{\partial F_{loss}}{\partial t} \right)$$

for inductive and capacitive measuring methods of the sensor head, and C(A, f, t) is given by CO(func(A, f, t)—$F_{loss}$) for optical measuring methods of the sensor head. Co is a correlation coefficient, and $F_{loss}$ is force loss brought about by the bending force of the membrane of the transducer and inertial force. The method further involves subsequently placing at least one object with the volume $V_S$ inside the measuring chamber and generating a signal $\varepsilon_S$ by applying the same amplitude A and frequency f as in the empty measurement, wherein the following equation applies to the signal $\varepsilon_S$ generated:

$$\varepsilon_s = \frac{V_0 - V_S}{p_a \gamma_q S^2} C(A, f, t).$$

$\gamma_q$ is the quasi-adiabatic index of the air or gas in the gas space of the measuring chamber, C(A, f, t) is given by $$C_0 \left( \frac{\partial func(A, f, t)}{\partial t} - \frac{\partial F_{loss}}{\partial t} \right)$$

for inductive and capacitive measuring methods of the sensor head, and C(A, f, t) is given by C₀(func(A, f, t)—$F_{loss}$) for optical measuring methods of the sensor head. $C_0$ is a correlation coefficient, and $F_{loss}$=force loss brought about by the bending force of the membrane of the transducer and inertial force. The method further includes determining the relative changes in $\varepsilon_{rel}$ of the signals ε and $\varepsilon_S$, which are a linear function of the object volume $V_S$ and to which the following relationship applies:

$$\varepsilon_{rel} = \frac{\varepsilon - \varepsilon_S}{\varepsilon} = \frac{V_S}{V_0}.$$

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1A:
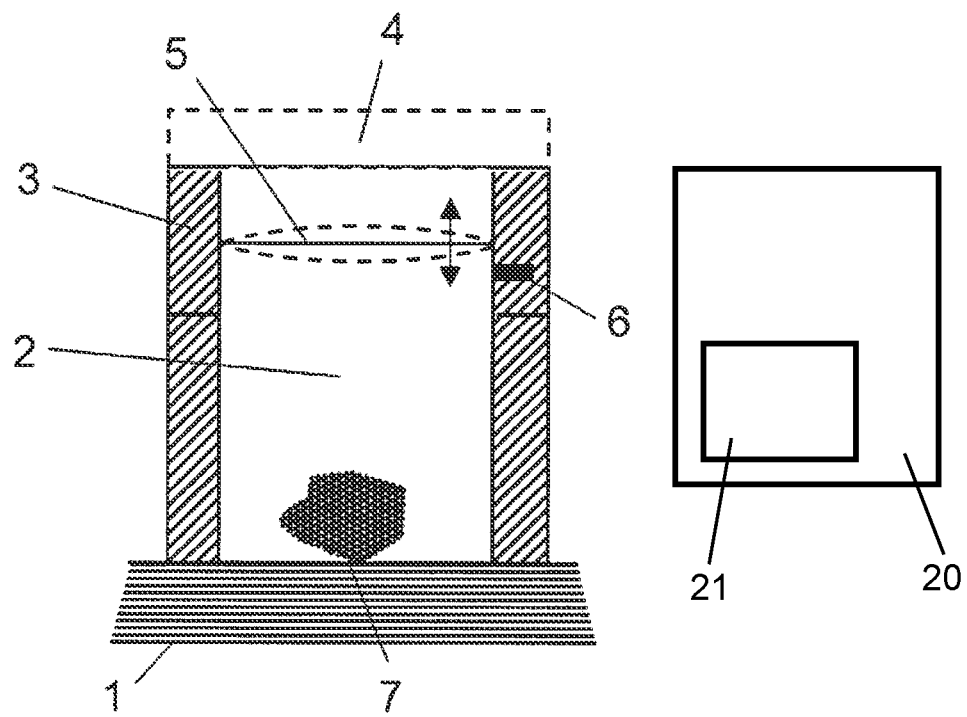
FIG. 1a provides a schematic general structure of a device according to the present disclosure.

The present disclosure provides for overcoming the specified disadvantages.

The disclosure relates to a method for determining the total volume and/or the true volume of objects, with which a transducer causes a gas space of a closed measuring chamber to be compressed or expanded by alternating compression and expansion of the gas in the gas space of the measuring chamber, this volume change ΔV in the measuring chamber causes a movement change of a membrane of a transducer, wherein the movement of this membrane of the transducer correlates linearly with the volume change ΔV in the measuring chamber, wherein at least one frequency triggers the mechanical movement of this membrane of the transducer as a function of the volume of an object in a measuring chamber and the movement change of the membrane is measured by a sensor head, and wherein the correlation for the volume change ΔV in the measuring chamber can be described by $$\Delta V \approx S \Delta l \quad \text{(Equation 5)}$$

where
ΔV=volume change,
ΔL=deflection of the membrane of the transducer and
S=surface area of the membrane of the transducer,
that first, an empty measurement without an object in the measuring chamber is carried out, wherein a signal ε is generated in the measuring space without an object, and wherein the following equation applies to this signal ε without an object in the measuring chamber:

$$\varepsilon = \frac{V_0}{p_a \gamma_q S^2} C(A, f, t) \quad \text{(Equation 6)}$$

where
A=amplitude,
f=frequency,
t=time,
$V_0$=internal volume of the measuring chamber,
$p_a$=ambient pressure and
$\gamma_q$=quasi-adiabatic index of the air/gas in the gas space of the measuring chamber, where $$C(A, f, t) = C_0 \left( \frac{\partial func(A, f, t)}{\partial t} - \frac{\partial F_{loss}}{\partial t} \right)$$

for inductive and capacitive measuring methods of the sensor head,
and
C(A, f, t)=C₀(func(A, f, t)—$F_{loss}$) for optical measuring methods of the sensor head, wherein
$C_0$=correlation coefficient and
$F_{loss}$=force loss brought about by the bending force of the membrane of the transducer and inertial force,
that at least one object with the volume $V_s$ is subsequently placed inside the measuring chamber and a signal $\varepsilon_S$ is generated by applying the same amplitude A and frequency f as in the empty measurement and the following equation applies to the signal $\varepsilon_S$ generated:

$$\varepsilon_S = \frac{V_0 - V_S}{p_a \gamma_q S^2} C(A, f, t) \quad \text{(Equation 7)}$$

where $\gamma_q$=quasi-adiabatic index of the air or gas in the gas space of the measuring chamber, where $$C(A, f, t) = C_0 \left( \frac{\partial func(A, f, t)}{\partial t} - \frac{\partial F_{loss}}{\partial t} \right)$$

for inductive and capacitive measuring methods of the sensor head,
and
C(A, f, t)=C₀(func(A, f, t)—$F_{loss}$) for optical measuring methods of the sensor head,
wherein
$C_0$=correlation coefficient and
$F_{loss}$=force loss brought about by the bending force of the membrane of the transducer and inertial force,
that the relative changes $\varepsilon_{rel}$ of the signals ε and $\varepsilon_s$ are determined, which are a linear function of the object volume $V_s$ and to which the following relationship applies:

$$\varepsilon_{rel} = \frac{\varepsilon - \varepsilon_s}{\varepsilon} = \frac{V_s}{V_0} \quad \text{(Equation 8)}$$

The disclosure furthermore relates to a device for carrying out the method described above, comprising a measuring base, a closable measuring chamber, means for generating and detecting pressure changes in the measuring chamber, comprising at least one transducer head and at least one sensor head, wherein the transducer head has a transducer with a membrane.

With the method and the device, it is now possible to provide a device and a method that are of a technically simple construction in comparison to the prior art and by means of which a precise and rapid measurement of the total volume or of the true volume of regularly and irregularly shaped objects is possible.

It is furthermore also possible to determine the total volume or true volume of a group of objects, for example bulk material, and also to determine the total volume of these objects together with the volume located in the pores. With the method and the device, it is furthermore also possible to determine the porosity of objects.

The term "total volume" refers to the volume that includes the volume of the solid body of the object, together with the volume of any cavities that the object contains or that surround the object, such as the interstices of objects arranged in the bulk material or pores that the object has or also a cavity surrounded by an envelope of the object.

By contrast, the term "true volume" refers to the volume of an object that includes the pure volume of the object without the volume of any cavities (e.g., of pores or interstices).

Cavities can only be measured if they are accessible from the outside. Cavities completely enclosed in the object therefore cannot be detected.

FIG. 1a shows a schematic view of the device. The object 7 to be examined is located on the measuring base 1. The object 7 is surrounded by the measuring chamber 2. This measuring chamber 2 comprises a transducer head 3 with an electromechanical transducer 5 and an optional pressure sensor 6. A sensor head 4 is connected to the transducer 5. Either at least one or several objects 7 can be introduced directly into the measuring chamber 2.

Figure 1B:
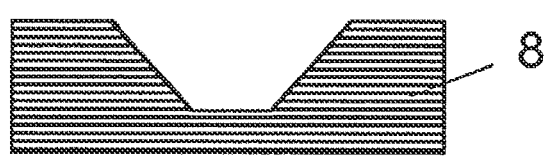
FIG. 1b illustrates a bowl-shaped insert for receiving objects.

FIG. 1b shows a bowl-shaped insert 8 with a recess in the center.

Figure 1C:
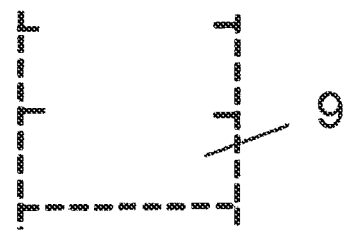
FIG. 1c illustrates a net-shaped basket insert for receiving objects.

FIG. 1c shows a porous or net-like basket 9.

This bowl-shaped insert 8 or basket insert 9 can be used to measure several objects 7 simultaneously in the device. These inserts 8 and 9 are either used as a replacement for the measuring base 1 or placed on the measuring base 1 in the measuring chamber 2.

Figure 2:
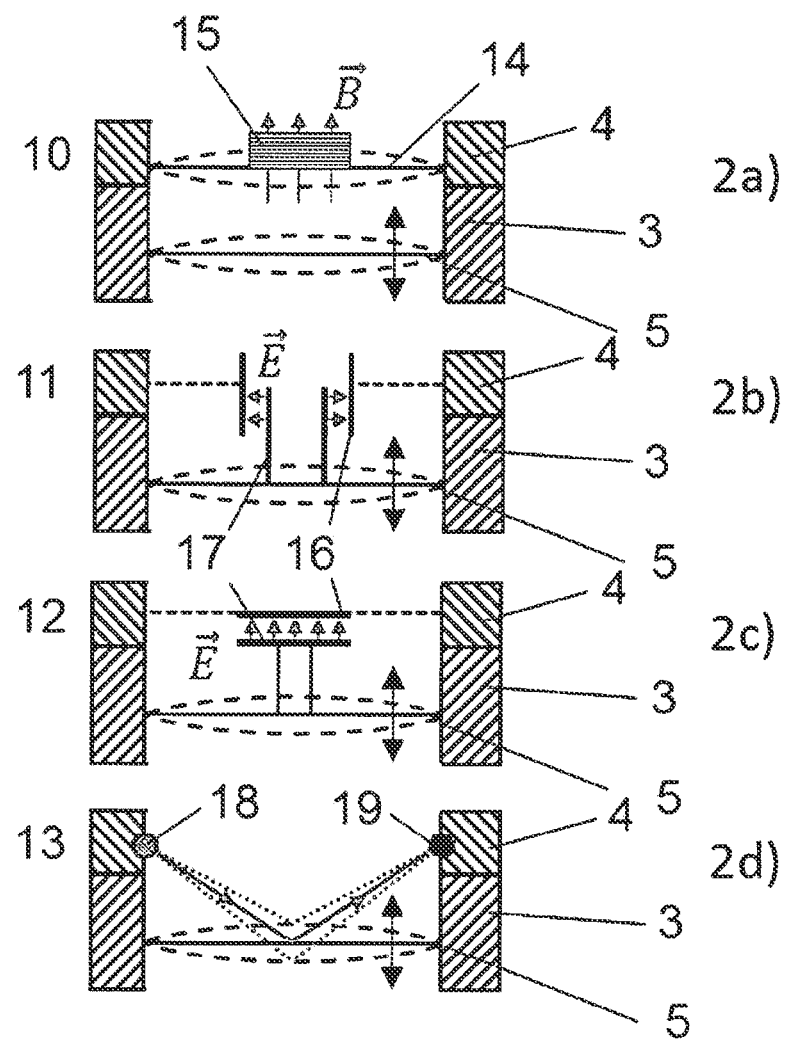
FIG. 2 provides schematic views of different possible measurement approaches.

FIG. 2 shows, by way of example, schematic views 2a), 2b), 2c), 2d) of sensor heads 4, with which various measurement approaches 10, 11, 12, 13 for detecting the mechanical movements of the membrane of the transducer 5 are shown. The symbol "B" in FIG. 2a) here means the magnetic flux density. The symbol "E" in FIGS. 2b) and 2c) here means the electric field strength.

Embodiment 10 in FIG. 2a) shows an inductive measurement approach. Embodiments 11 and 12 in FIGS. 2b) and 2c) show a capacitive measurement approach, and embodiment 13 in FIG. 2d) shows an optical measurement approach.

Figure 3:
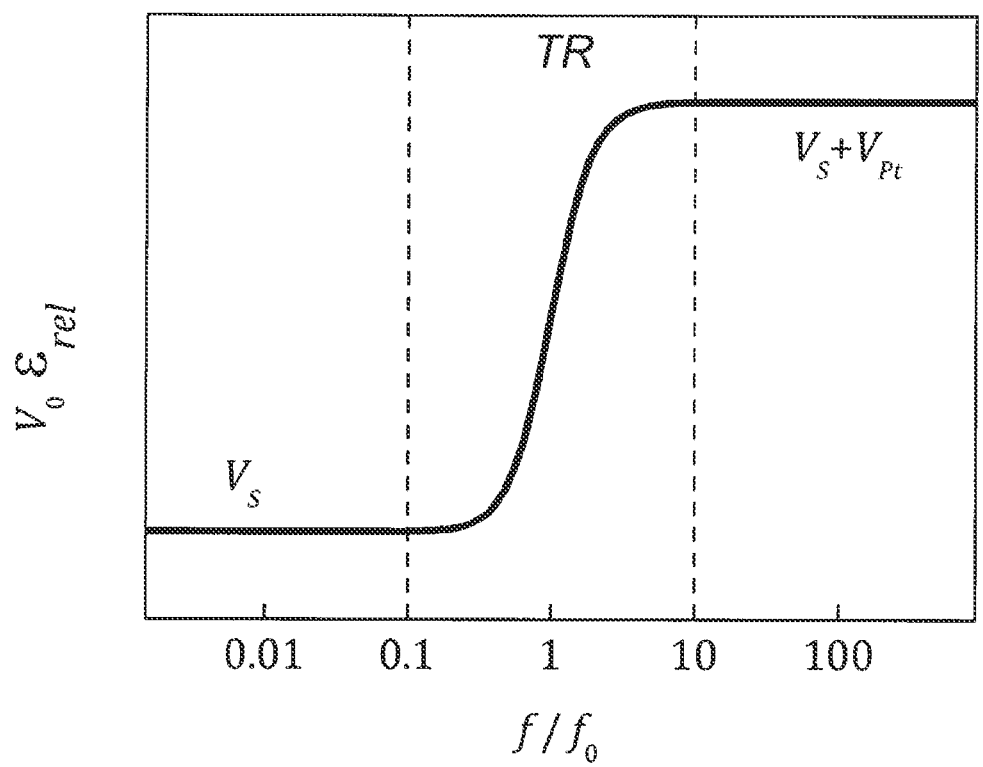
FIG. 3 is a schematic representation of the measured relative signal multiplied by the internal volume of the chamber as a function of the normalized operating frequency.

FIG. 3 shows the schematic representation of the measured relative signal $\varepsilon_{rel}$ multiplied by the internal volume (empty volume) $V_0$ of the measuring chamber as a function of the normalized operating frequency $f/f_0$, wherein the abscissa axis represents the normalized operating frequency $f/f_0$ and the ordinate axis represents the values of the measured relative signal $\varepsilon_{rel}$ multiplied by the internal volume (empty volume) $V_0$ of the measuring chamber. The designation "TR" in the course of the curve denotes the transition range.

The following description of the preferred embodiments is merely exemplary in nature and is not intended to limit the invention, its application or its use.

According to FIG. 1a, an advantageous embodiment of the device consists of a measuring base 1, a measuring chamber 2, a transducer head 3 and a sensor head 4.

By structuring the device with only one measuring chamber 2, the volume of an object 7 or of several objects 7 that lie on the measuring base 1 can be measured directly. The design of the device with only one measuring chamber 2 has the advantage that the measuring conditions inside this one measuring chamber 2 can be kept constant and measuring errors do not occur in the event of changes in the measuring conditions. Measuring errors can arise if, for example, as known from the prior art, a measuring chamber and a separate reference chamber are used; in this case, the conditions in the two chambers can change differently, as a result of which the chambers can no longer be compared to one another, which in turn leads to measuring errors. The measuring chamber 2 can advantageously be easily closed with the measuring base 1. For this purpose, for example, the dead weight of the measuring chamber 2 suffices to sufficiently close the device with the measuring base 1.

An electromechanical transducer 5 with a membrane and optionally also a pressure sensor 6 are installed in the transducer head 3. The double arrow in Figure 1a indicates the up-and-down movement of the membrane of the transducer 5. The membrane of the transducer =generates a volume change in the measuring chamber 2 due to the up-and-down movement. Various types of loudspeakers or microphones can be used as electromechanical transducer 5, for example. Capacitive capacitor microphones or inductive microphones can be used here, for example.

The pressure sensor 6 serves for pressure control in the device and ensures that, in particular in the case of measurements, with which different frequencies are used, a virtually identical pressure prevails in the measuring chamber 2, namely when measuring in the measuring chamber 2 without an object 7 and with an object 7.

This virtually identical pressure is achieved by changing the amplitude or the current of the loudspeaker of the electromechanical transducer 5 in such a way that the pressure remains virtually identical for measurements with and without an object at different frequencies.

The pressure sensor 6 furthermore reduces the occurrence of resonances.

This pressure sensor 6 and the adjustment of the virtually identical pressure ratios play an important role in particular when the porosity of objects is to be determined, which can be measured over a frequency range between 20 and 6000 Hz, which is large in comparison to the prior art.

An exchangeable measuring chamber 2 is open at the top in order to ensure an air connection to the membrane of the transducer 5, wherein it is preferably connected to the housing of the transducer head 3 in a gas-tight manner. The measuring chamber 2 is also open at the bottom and can likewise be placed in a gas-tight manner onto the measuring base 1 on which the object 7 lies. For example, a laboratory table, a planar solid material or also a weighing pan can be used as the measuring base 1 in case the device is to be used for pycnometric measurements.

In the measuring chamber 2, the transducer 5 provides an alternating compression and expansion of the air or the gas in the measuring chamber 2. The sensor head 4, which detects the movements of the membrane of the transducer 5 directly or indirectly, is as a rule connected to the other side of the housing of the transducer head 3. Depending on the type of sensor head 4, however, it can also be arranged between the housing of the transducer head 3 and the measuring chamber 2. For example, a commercially available loudspeaker can be used for the transducer 5.

A bowl-shaped insert 8 with a recess in the center or a porous or net-like basket 9 can be used to measure several objects 7 simultaneously. Depending on the application, the bowl-shaped insert 8 with the recess in the center can replace the measuring base 1. Alternatively, the basket 9 together with the objects 7 located therein can be introduced into the measuring chamber 2.

The transducer 5 can be an electromechanical transducer fed by an electronic signal generator 21 (e.g., a digital analog converter, DAC). The signal generator 21 can in turn be controlled, for example, by a microcontroller or a computer 20. The compression or expansion pressure in the measuring chamber 2 depends on the amplitude of the signal generated by the signal generator 21 of the transducer 5. In order to keep the pressure inside the measuring chamber constant at different frequencies and in order to avoid measurement inaccuracies, which can occur as a result of possible pressure fluctuations in the measuring chamber, in particular at different operating frequencies, the pressure is recorded by a pressure sensor 6 as already illustrated above. If possible, the pressure sensor 6 should not change the volume of the measuring chamber 2, which can be realized, for example, with a capacitor microphone. Thus, the pressure in the measuring chamber 2 can be kept constant by the pressure sensor 6 when measuring with and without an object 7 at several different frequencies.

By using a pressure sensor 6 that is used to regulate the amplitude of the transducer 5, the occurrence of resonance oscillations can also be reduced.

The sensor head 4 has the task of measuring the movements of the membrane of the transducer 5 directly or indirectly.

The sensor head 4 can have, for example, various measurement approaches or measuring characteristics shown in FIGS. 2a) to 2d): inductive 10, capacitive 11 or 12 and optical 13.

In the inductive measurement approach 10, the sensor head 4 is firmly connected to the housing of the transducer head 3, designed as a dynamic microphone consisting of a membrane 14 and a coil 15. Alternatively, the coil 15 can also be fixed directly to the membrane of the transducer 5. The simplest examples of the membrane 14 with the coil 15 are an inductive microphone or a loudspeaker with a membrane that is light and easy to move, in order to keep the load on the membrane of the transducer 5 as small as possible. Movement of the membrane of the transducer 5 causes movement of the membrane 14 of the sensor head. The induced voltage can be measured at the coil 15.

With the specified capacitive measurement approaches 11 and 12, a solid plate 16 with a plate 17 fixed to the membrane of the transducer 5 forms a variable capacitance. With the change in capacitance, the field strength "E" changes (principle of a capacitor microphone).

With the optical measurement approach 13, a light source 18 emits light that is reflected by the membrane of the transducer 5 to a photosensor 19. The phase and intensity changes detectable in the process, which are caused by the movements of the membrane of the transducer 5, serve to determine the membrane position.

FIG. 3 shows by way of example and schematically the measured relative signal Ere/multiplied by the internal volume $V_0$ of the measuring chamber 2 as a function of the normalized operating frequency $f/f_0$ of the sinusoidal signal present at the membrane of the transducer 5.

Here, the frequency f correlates with the velocity of the movements of the membrane of the transducer 5, and $\varepsilon_{rel}$ is calculated using RMS values of the measured signals $\varepsilon$ and $\varepsilon_S$ (see Equation 8 below).

At frequencies higher than the transition frequency $f_0$, the air/gas has no time in the measuring chamber 2 due to its viscosity to penetrate into the pores of the object 7. In this case, the total volume $V_{ges}=V_S+V_{Pr}$, i.e., the actual ("true") volume $V_S$ of the object 7, is measured together with that of its potentially present pores or cavities $V_{Pr}$. The behavior of the transition range TR and the transition frequency $f_0$ depend on the physical sizes of the pores or cavities, the ambient pressure and the viscosity of the air in the measuring chamber 2.

The method is described by way of example below:

In operation, a periodic signal is applied as a function of the amplitude A, the frequency f and the time t, to the membrane of the transducer 5, as a result of which this membrane transmits the force F to the air or the gas in the measuring chamber 2. This force F is a function of the applied signal so that the following Equation 1 applies:

$$F=\text{func}(A, f, t). \qquad \text{(Equation 1)}$$

For example, when a loudspeaker is used as the membrane of the transducer 5, F is the Lorentz force and A is the applied current amplitude.

The force F is divided into two parts: the force loss, $F_{loss}$, which is brought about by the bending force of the membrane and inertial forces, and the action force $F_{act}$, which compresses or expands the air in the measuring chamber 2 as a result of the generated pressure difference $\Delta_p$. The following Equation 2 applies:

$$\Delta p = \frac{F_{act}}{S} = \frac{F - F_{loss}}{S}, \qquad \text{(Equation 2)}$$

wherein S is the surface area of the membrane of the transducer 5.

The measuring chamber 2 is not completely closed with regard to heat exchange. At very low operating frequencies, f→0, there is isothermal compression and expansion; in this case, the air has enough time in the measuring chamber 2 to compensate for its temperature at each position of the measuring chamber 2 by exchanging the heat with the walls of the sensor.

In contrast, at infinitely high frequencies, f→∞, there is adiabatic compression and expansion; in this case, the air does not follow the temperature of the walls. However, these are only ideal, extreme cases.

In practice, on the other hand, it is necessary to consider the quasi-adiabatic regime of operation of the device with the quasi-adiabatic index $\gamma_q$, wherein the value varies from 1 (at f→0) to≈1.4 (at f→∞; i.e., adiabatic index for air).

The quasi-adiabatic regime can be described as $$p_a V_0^{\gamma_q}=(p_a+\Delta p)(V_0-\Delta V)^{\gamma_q}, \qquad \text{(Equation 3)}$$

where $p_a$=ambient pressure (atmospheric pressure or absolute pressure), at which the sensor operates, $V_0$=internal volume of the measuring chamber 2 and $\Delta V$=volume change caused by the movement of the membrane of the transducer 5.

When the pressure changes Δp are very small in comparison to the ambient pressure $p_a$, the volume change ΔV can be calculated as follows $$\Delta V \approx \frac{1}{\gamma_q} \Delta p \frac{V_0}{p_a}. \quad \text{(Equation 4)}$$

The disclosure relates to measurements of volume changes in ΔV by various techniques shown in an exemplary design in FIG. 2. All of these techniques monitor the movements of the membrane of the transducer 5, which in a first approximation correlates linearly with the changes of ΔV.

This correlation can be written as follows:

$$\Delta V \approx S \Delta l \quad \text{(Equation 5)}$$

where Δl is the deflection and S is the surface area of the membrane of the transducer 5.

The inductive 10 and capacitive 11, 12 measurement approaches together with the associated electronics generate the signal ε, which correlates with the displacement velocity of the membrane of the transducer 5. In contrast, the optical measurement approach 13 is a function of the distances of these displacements.

In combination with Equations (1), (2), (4) and (5), the signal ε can be written as follows:

$$\varepsilon = \frac{V_0}{p_a \gamma_q S^2} C(A, f, t) \quad \text{(Equation 6)}$$

where $$C(A, f, t) = C_0 \left( \frac{\partial func(A, f, t)}{\partial t} - \frac{\partial F_{loss}}{\partial t} \right)$$

for the inductive and capacitive methods 10-12 and C(A, f, t)=$C_0$(func(A, f, t)—$F_{loss}$) for the optical methods 13, $C_0$ is the correlation coefficient.

Equation 6 describes the signal 8 in the measuring chamber 2 without an object, hereinafter also referred to as "empty measurement."

For measurement with an object 7 in the device, at least one object 7 with the volume $V_S$ is placed inside the measuring chamber 2. The use of the same amplitude A and frequency f as in the "empty measurement" leads to changes in the remaining volume in comparison to (Equation 6) and thus to a change in the measurement signal, so that the following equation now applies:

$$\varepsilon_S = \frac{V_0 - V_S}{p_a \gamma_q S^2} C(A, f, t) \quad \text{(Equation 7)}$$

Equation 7 describes the signal $\varepsilon_S$ in the measuring chamber 2 with an object, hereinafter also referred to as "object measurement."

The relative changes $\varepsilon_{rel}$ of the signals ε and $\varepsilon_s$, which are a linear function of the object volume $V_S$, are measured so that:

$$\varepsilon_{rel} = \frac{\varepsilon - \varepsilon_s}{\varepsilon} = \frac{V_s}{V_0} \quad \text{(Equation 8)}$$

Depending on the application, the measuring chamber 2 can also be filled with desirable other gases (e.g., argon, nitrogen, carbon dioxide, oxygen) as air, as long as they are harmless to the materials of the device and do not undergo a chemical reaction with the material of the object 7 or the components of the device.

In a particularly advantageous embodiment of the device and method, the measurement of the porosity of an object is also included.

At a non-zero viscosity of the air or gas that fills the pores or cavities of the object 7 in the measuring chamber 2, different volumes are detected by the device at different frequencies.

At low frequencies, the velocity of the movements of the membrane of the transducer 5 is small enough so that the air or gas inside the pores can react to the changes in pressure in the measuring chamber 2. In this case, the actual "true" volume $V_S$ of the object 7 is measured without potential air or gas inclusions. However, the latter can only be detected or disregarded when they are open to the surface of the object. As shown in FIG. 3, this frequency range is before the respective transition range "TR," which prevails for the air or the gas used in the measuring chamber.

On the other hand, if the frequency of the membrane movements is so high that the air or gas inside the pores does not react to the pressure changes due to friction with the surface of the object 7 and between the air layers, the total volume $V_{ges}=V_S+V_{Pt}$ is measured, where $V_{Pt}$ is the volume of the pores. As shown in FIG. 3, this frequency range is above the respective transition range "TR" of the air or the gas in the measuring chamber 2.

In the case of long, ideally cylindrically shaped pores having the radius $r_p$ and the axial length $L_p$ and in the case of a laminar flow in the pores, the transition frequency $f_0$ is proportional to the following:

$$f_0 \sim \frac{p_a}{\mu} \frac{r_P^2}{L_P^2}$$

wherein μ describes the viscosity of the air or of the gas used.

For some pore systems, the transition frequency $f_0$ can be estimated, for example, as follows:

$$f_0 = \frac{p_a}{16\mu} \frac{r_P^2}{L_P^2}$$

However, the coefficient in the denominator can also assume values between 10 and 16, for example.

The aforementioned equation can deviate for another pore system and must in each case be adapted to the pore system to be examined by experimental investigations. The difference between the measured volumes at high and low frequencies yields the total volume of the pores $V_{Pt}=V_{ges}-V_S$ The quotient $\Phi=V_{Pt}/(V_S+V_{Pt})$ then describes the "porosity" Φ of the measured object 7.

The operating frequency range of the method is defined by the tightness of the measuring chamber 2 at low frequencies.

The highest frequencies are defined by the largest distance between two points in the measuring chamber 2, wherein the highest allowable frequency should preferably be 4 times smaller than the sound velocity in air/gas divided by this distance. A tested prototype of the device with an internal volume of approximately 1.8 milliliters can operate, for example, in the frequency range from 20 Hz to 6000 Hz.

The work at different frequencies, e.g., ≥2 frequencies, requires a pressure sensor 6. The pressure sensor offers the possibility of compensating for the pressure changes caused by the movements of the membrane of the transducer 5, which, as a function of the frequency, directly influence the behavior of the membrane of the transducer 5 itself, in an automated manner during the measurement. The transducer 5 can have a frequency dependence that leads to different maximum displacements of the membrane of the transducer 5 at different frequencies. Without suitable compensation by the pressure sensor 6, this would lead to an incorrect calculation of the volume of the object 7. A capacitor microphone, for example, can be used as pressure sensor 6.

In order to transmit a signal to the transducer 5, a digital analog converter (DAC) can be used as an example. The periodic signal should preferably be sinusoidal since in this case, there is a direct correlation between the frequency and velocity of the movements of the membrane of the transducer 5. An analog digital converter (ADC) or a comparable technology can be used as the signal reader of the sensor head 4.

For example, the following technologies are suitable for this purpose:
  a multifunction input/output device,
  an external sound card, e.g., with a USB connection,
  integrated sound cards from laptops and PCs.

The device and the method offer the following advantages over the devices and methods known from the prior art:
  The device can be produced without great effort and cost-effectively by, for example, using commercially available components.
  Technically simple structure of the device. For the simplest situation with an operating mode at only one fixed frequency, only a solid tube as measuring chamber and two loudspeakers are needed. A microphone is additionally required for multi-frequency operation. This is a great advantage over known acoustic volumeters, for example.
  A calibration volume is not necessarily required for a measurement. However, the use of a calibration volume can advantageously increase the precision of a measurement.
  It allows rapid measurements with, for example, less than 2 seconds in the single frequency operating mode, or less than 15 seconds when measuring in a frequency range of 20 Hz to 6000 Hz in 30 frequency steps, for example.
  It allows measurements in a large operating frequency range, e.g., in a preferred embodiment in the range from 20 Hz to 6000 Hz, which can preferably be used for measuring the porosity of an object. Theoretically, one can measure in the range of 0 Hz to $75 \times (L[m])^{-1}$ Hz, wherein L describes the largest distance between two points in a measuring chamber.
  It has a large measuring range, e.g., in a tested design for measuring seed in the volume range of 1 microliter to a few, e.g., 1000, milliliters.
  The absolute measuring error is small and constant. In a tested embodiment of the volumeter, the error of approximately 0.5 microliters is about 3600 times smaller approximately 0.03%) than the internal volume of the measuring chamber (1.8 milliliters).
  It offers a simple possibility for determining the porosity of a solid object.
  Suitability for being integrated into fully automated systems for determining the volume of objects.

The objects to be examined can be a wide variety of materials, which are constituted such that they are preferably solid or liquid. Suitable objects are, for example, seeds, leaves, stones, and solid or liquid bodies of any geometry.

Furthermore, the object to be measured can consist of a composition of various objects or a group of regularly and/or irregularly shaped objects, such as sand or other bulk material.

Due to the possibility of providing a technically simply constructed and portable device that is constructed from standard mechanical components and relatively simple electronic parts, the method and the device can also be used, for example, for the following fields of application and volume determinations of different objects:
  Determination of the volume of regularly shaped objects;
  Leakage measurement of hollow bodies;
  Determination of the volume of seeds and measurement of their porosity;
  Determination of the total volume of many seeds and their fill volume;
  Determination of the total volume of any bulk material and its fill volume;
  In combination with a balance, determination of the density of objects and materials, for example in the case of the density of seeds for estimating their moisture or oil content;
  Measuring small tubes to check the roughness of their inner surfaces;
  In combination with a balance, determination of the density of eggs to check their age, since the egg weight, and thus the density, decreases with increasing age;
  Fill state of ears of grain during seed maturation;
  Measurements on plant leaves at closed or open stomata, in order to determine their internal cavities (aerenchymas), which are important for $CO_2$ assimilation (photosynthesis);
  Measurements of whole plants to estimate their volume as an approximation (proxy) of their biomass;

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

1=Measuring base
2=Measuring chamber
3=Transducer head
4=Sensor head
5=Transducer
6=Pressure sensor
7=Object
8=Bowl-shaped insert
9=Net-shaped basket insert
10=Inductive measurement approach
11=Capacitive measurement approach
12=Capacitive measurement approach
13=Optical measurement approach
14=Membrane
15=Coil
16=First plate for variable capacitance
17=Second plate for variable capacitance
18=Light source
19=Photosensor

The invention claimed is:

1. A method for determining a volume Vs of one or more objects to be measured, the method comprising:
  carrying out an empty measuring chamber measurement, carrying out the empty measuring chamber measurement comprising:
    providing a closed measuring chamber in an empty state, the closed measuring chamber having a gas space, the empty state being a state in which the one or more objects to be measured are not present in the gas space,
    applying an applied signal func (A,f,t) to a transducer having a membrane, the applied signal func (A,f,t) causing a first mechanical movement of the membrane of the transducer, the first mechanical movement of the membrane causing an alternating compression and expansion of a gas in the gas space of the measuring chamber in the empty state,
    generating, by a sensor head configured to measure mechanical movement of the membrane, a first measurement, in the form of a first measurement signal ε, of the first mechanical movement of the membrane, the first measurement signal ε having the form:

$$\varepsilon = \frac{V_0}{p_a \gamma_q S^2} C(A, f, t)$$

wherein A is an amplitude of the applied signal, f is a frequency of the applied signal, t is time, $V_0$ is an internal volume of the measuring chamber, $P_a$ is an ambient pressure, $Y_q$ is a quasi-adiabatic index of the gas in the gas space of the measuring chamber, S is a surface area of the membrane, C (A, f, t) is a function having the form $$C_0 \left( \frac{\partial func(A, f, t)}{\partial t} - \frac{\partial F_{loss}}{\partial t} \right)$$

if the sensor head is configured for inductive or capacitive measurements or having the form $C_0(func (A, f, t)-F_{loss})$ if the sensor head is configured for optical measurements, $C_0$ is a correlation coefficient, and Floss is a force loss brought about by a bending force of the membrane and inertial force;
  carrying out an occupied measurement chamber measurement, carrying out the occupied measurement chamber measurement comprising:
    applying, while the one or more objects to be measured are present in the gas space of the measuring chamber, the same applied signal func (A,f,t) to the transducer, the applied signal func (A,f,t) causing a second mechanical movement of the membrane of the transducer, the second mechanical movement of the membrane causing an alternating compression and expansion of the gas in the gas space of the measuring chamber in which the one or more objects to be measured are provided, and
    generating, by the sensor head, a second measurement, in the form of a second measurement signal εs, of the second mechanical movement of the membrane, the second measurement signal εs having the form:

$$\varepsilon_S = \frac{V_0 - V_S}{p_a \gamma_q S^2} C(A, f, t);$$

and
  determining the volume Vs of the one or more objects to be measured based on (i) a relative change εrel of the first measurement signal ε and the second measurement signal εs and (ii) the relationship $$\varepsilon_{rel} = \frac{\varepsilon - \varepsilon_s}{\varepsilon} = \frac{V_s}{V_0}.$$

2. The method according to claim 1, wherein the applied signal func (A,f,t) has, for at least some values of time t, a frequency in a frequency range from >0 Hz to $$\frac{v}{4*L}$$

Hz wherein L is a greatest distance between two points in the measuring chamber and v is a velocity of sound in the gas in the gas space of the measuring chamber.

3. The method according to claim 1, wherein the frequency f of the applied signal func (A,f,t) is a time varying frequency having, at several different values of time t, several different frequency values.

4. The method according to claim 1, wherein the frequency f of the applied signal func (A,f,t) is a time-varying signal that assumes at least a first frequency value below a respective transition frequency range and a second frequency value above the respective transition frequency range.

5. The method according to claim 1, wherein the volume Vs of the one or more objects to be measured is a true volume of the one or more objects to be measured, and wherein the frequency f of the applied signal func (A,f,t) assumes at least one frequency value at which gas in pores of the one or more objects to be measured can react to pressure changes in the measuring chamber.

6. The method according to claim 5, further comprising determining a total volume of the one or more objects to be measured by adjusting the frequency of the applied signal to assume a frequency value at which the gas in the pores of the one or more objects to be measured cannot react to pressure changes in the measuring chamber.

7. The method according to claim 1, wherein the gas in the gas space of the measuring chamber is a gas or a mixture of gases that do not chemically react with the components in the measuring chamber or of the object to be measured.

8. The method claim 1, wherein the applied signal func (A,f,t) has a single frequency and the first measurement and the second measurement are carried out during a respective measurement time of 2 seconds or less.

9. The method according to claim 1, wherein the applied signal func (A,f,t) has different frequency values for different values of time t and each of the first measurement and the second measurement are carried out during a respective measurement time of 15 seconds or less.

10. The method according to claim 1, wherein the volume Vs of the one or more objects to be measured is in a range of 1 microliter to 1000 milliliters.

11. A device configured to carry out the method according to claim 1, the device comprising:
- a measuring base,
- the measuring chamber, wherein the measuring chamber is closable,
- a sensor apparatus for generating and detecting pressure changes in the measuring chamber, the sensor apparatus comprising:
  - at least one transducer head including the transducer comprising the membrane, and
  - the sensor head including a signal reader; and
- a signal generator configured to apply the applied signal func (A,f,t) to the transducer.

12. The device according to claim 11, wherein the transducer is a loudspeaker.

13. The device according to claim 11, further comprising at least one pressure sensor configured to measure a pressure in the measuring chamber.

14. The device according to claim 11, wherein the gas in the gas space of the measuring chamber is a gas or a mixture of gases that do not chemically react with the components in the measuring chamber or of the object to be measured.

15. The device according to claim 11, wherein by its dead weight, the measuring chamber can be closed with the measuring base.

16. The device according to claim 11, wherein the sensor head is configured to measure mechanical movement of the membrane via at least one of inductive, capacitive, and/or optical measurements.

17. The device according to claim 11, wherein the sensor head is configured to measure mechanical movement of the membrane via inductive measurements, is firmly connected to a housing of the transducer head, and is designed as a dynamic microphone consisting of a membrane and a coil.

18. The device according to claim 17, wherein the coil is fixed directly to the transducer.

19. The device according to claim 11, wherein the sensor head is configured to measure mechanical movement of the membrane via capacitive measurements and comprises at least one first plate of variable capacitance, which is fixed on a housing of the sensor head, and at least one second plate connected to the membrane of the transducer.

20. The device according to claim 11, wherein the sensor head is configured to measure mechanical movement of the membrane via optical measurements and comprises a light source and a photosensor, wherein light emitted by the light source is reflected by the membrane of the transducer to the photosensor.

21. The device according to claim 13, wherein the pressure sensor is a capacitor microphone configured to maintain a pressure in the measuring chamber and reduce the occurrence of resonances.

22. The device according to claim 11, further comprising net-like or basket-like inserts for receiving several objects to be measured.

23. The device according to claim 11, further comprising a weighing unit.

* * * * *